United States Patent [19]

Hone et al.

[11] Patent Number: 5,329,106
[45] Date of Patent: Jul. 12, 1994

[54] HANDLE-LESS BAR CODE SCANNING SYSTEM

[75] Inventors: L. Michael Hone; Vincent T. La Manna, both of Webster; Harold McGuire, Ontario, all of N.Y.

[73] Assignee: PSC, Inc., Webster, N.Y.

[21] Appl. No.: 955,571

[22] Filed: Oct. 2, 1992

[51] Int. Cl.$^5$ ............................................. G06K 7/10
[52] U.S. Cl. ................................... 235/472; 235/462
[58] Field of Search ................................ 235/472, 462

[56] References Cited

U.S. PATENT DOCUMENTS

| | | | |
|---|---|---|---|
| 3,978,318 | 8/1976 | Romeo et al. | 235/472 |
| 4,766,299 | 8/1988 | Tierney et al. | 235/462 |
| 5,191,197 | 3/1993 | Metlisky et al. | 235/472 |

FOREIGN PATENT DOCUMENTS

| | | | |
|---|---|---|---|
| 0414452 | 2/1991 | European Pat. Off. | 235/472 |
| 0579798 | 1/1974 | Fed. Rep. of Germany | 364/708 |
| 60-201056 | 10/1985 | Japan | 364/708 |

OTHER PUBLICATIONS

"Wrist Worn Terminal", IBM T.D.B., vol. 15 No. 11 Apr. 1973 Ludeman et al.
"Wearable Scanner/Raises Productivity", Automatic I.D. News, Shipping/Receiving col. and Symbol Tech. Advertisement, Aug. 1992 p. 24.

Primary Examiner—John Shepperd
Assistant Examiner—Jhihan Clark
Attorney, Agent, or Firm—Martin LuKacher

[57] ABSTRACT

A scanning system utilizing a scanner which is located in a case of size adapted to fit in the palm of the hand or to be attached to the hand along the top outside surface of the hand between the fingers and the wrist. The scanner includes a scan engine within the case mounted on a printed circuit board which scans symbols having data identifying characteristics, which are visible through a window in a side wall of the case. A switch for enabling scanning operations may be provided by a manually actuated trigger on the printed circuit board and an arm which is pivotally mounted on a post which aligns the scan engine in the case and is captured in an opening along a wall of the case. The scanner may be connected by a retractable cable to a retraction unit which can be carried by the operator. The system may be configured with the scanner on the outer side of the hand and held on the hand as by a strap or glove. A light weight arm unit is carried on the forearm. A terminal may be carried by the operator as on his or her belt. The arm unit has an outside or top surface with a keypad and display. The keypad enables the system to be turned on and off and for data to be entered which is transferred to the terminal. Passages in the arm unit are provided for cables which connect the scanner to the arm unit and the arm unit to the terminal.

5 Claims, 8 Drawing Sheets

HANDLE-LESS BAR CODE SCANNING SYSTEM

FIELD OF THE INVENTION

The present invention relates to bar code scanning systems and particularly to bar code scanners and scanning systems which are miniature in size and light in weight so as to minimize operator effort, reduce operator fatigue and enhance productivity for bar code reading and data entry operations.

BACKGROUND OF THE INVENTION

The invention is especially adapted to provide a handle-less bar code scanning system wherein a bar code scanner is contained in a unit without a handle and which may be held in the palm of the operators hand or upon the back of the hand, when hands free operation is desired. The term "bar code" means any optically perceivable symbol or arrangement of symbols having data representing characteristics. The system is however preferably used with a bar code having alternate light and dark bars of different width to represent different data such as can identify different products, objects or operations, especially for inventory management and control.

Productivity of operators is a function of stress and strain on the operator and operator fatigue. Conventional bar code readers are gun shaped and must be removed from receptacles, such as holsters, when put into use. Such units are also not adaptable to hands free operation. In addition, other data items which are not scannable must be manually entered. It is also desirable to provide interactive operations so that the operators are instructed by information appearing on a display to perform various operations, such as manual entry of information items, picking or placing of certain items and other transactional tasks. The development of scanning systems which provide both convenient handling of the scanner, hands free operation and manual data entry and management of operators performing scanning operations without substantial increase in the size of the systems and the weight of the systems which would be detrimental to efficiency, productivity and reduction of errors in the field has presented significant problems. A system has been proposed for hands free bar code scanning where a scanner is mounted on the hand and a unit is mounted on the arm which contains a data collection memory batteries, a display and a keyboard. However the hand mounted unit and arm mounted units are heavier and require more muscular operators than is desired.

SUMMARY OF THE INVENTION

It is the principal object of the present invention to provide improved bar code scanning systems which are handle-less in configuration and are adaptable to hands free operation without the need for units which are so large and heavy as to engender fatigue, reduction in productivity (including repeat operations due to errors).

It is a further object of the invention to provide handle-less bar code scanning systems which may be associated with an automatic retractor (such as used in measuring tapes) and which automatically stows the handle-less scanner in retracted position when not in use and holds the scanner for subsequent retraction when it is grasped and extended by the operator for bar code scanning operations.

It is a still further object of the invention to provide an improved hands free bar code scanning and data entry system of such size and weight as to be carried on the hand and forearm of the operator and associated through cables with a terminal which may be carried by the operator separately on a belt and contain a battery pack for providing electrical operating power to the scanner and the arm unit; the scanner and the unit being of such light weight and small size as not to require muscular individuals and not to engender operator fatigue.

Briefly described, a handle-less bar code scanner system in accordance with the invention utilizes a scanner having a case with walls which are spaced to define a region of width and length commensurate with an adult human hand so that the case is locatable in or on the hand of an operator. One of the walls is forwardly facing and has a window. The scanner has a scan engine mounted in the case which enables the scanning and reading of the bar code through the window. The scan engine provides signals representing the code, and the scan engine may have its optical and electrical components mounted on a printed circuit board. Upper and lower sections of the case have parting edges which are engagable with each other when the sections are in assembled relationship. Internal structure in the case may be used to journal a trigger arm which extends outwardly through an opening in a wall of the case and is captured against a switch as to actuate the switch when bar code scanning operation is desired. The scanner may be connected to a cable which is reelable into and out of a retraction mechanism, such as used for measuring tapes. The retraction mechanism can be mounted either within the scanner case or exteriorly of it. When the cable is released, the scanner is automatically retracted to stowed position. By grasping the handle-less scanner case, the scanner can be extended for bar code reading operations. The cable may be connected to a terminal which is carried, as on a tool belt around the waist of the operator. The scanner may be adapted to operate at low power and detect the presence of a bar code without the need for manual trigger. Such a unit is desirably attached to the outside of the hand between the fingers and the wrist, while an arm unit containing a display and keyboard is mounted on the forearm. The bottom or inside of the arm unit may be configured in a shape (e.g. cylindrical) to conform with the forearm and may be provided with passageways for cables connecting the arm unit to the scanner unit on the wrist and to the terminal of the system. The terminal contains the necessary battery pack. Therefore the arm unit and wrist scanner may be extremely light in weight and small in size to minimize operator fatigue and improve productivity. The arm unit controls the display and associated keyboard by internal stored program control or by commands transferred from the terminal to the arm unit. The functions of different keys may be changed and indicated by messages which appear on the display. The keys on the keyboard may be used to enable operation of the scanner and the arm unit. Thus manual control and interactive management of bar code scanning and data entry operations can be provided.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which.

DETAILED DESCRIPTION OF THE PREFERRED EMBODIMENT

Figure 1:
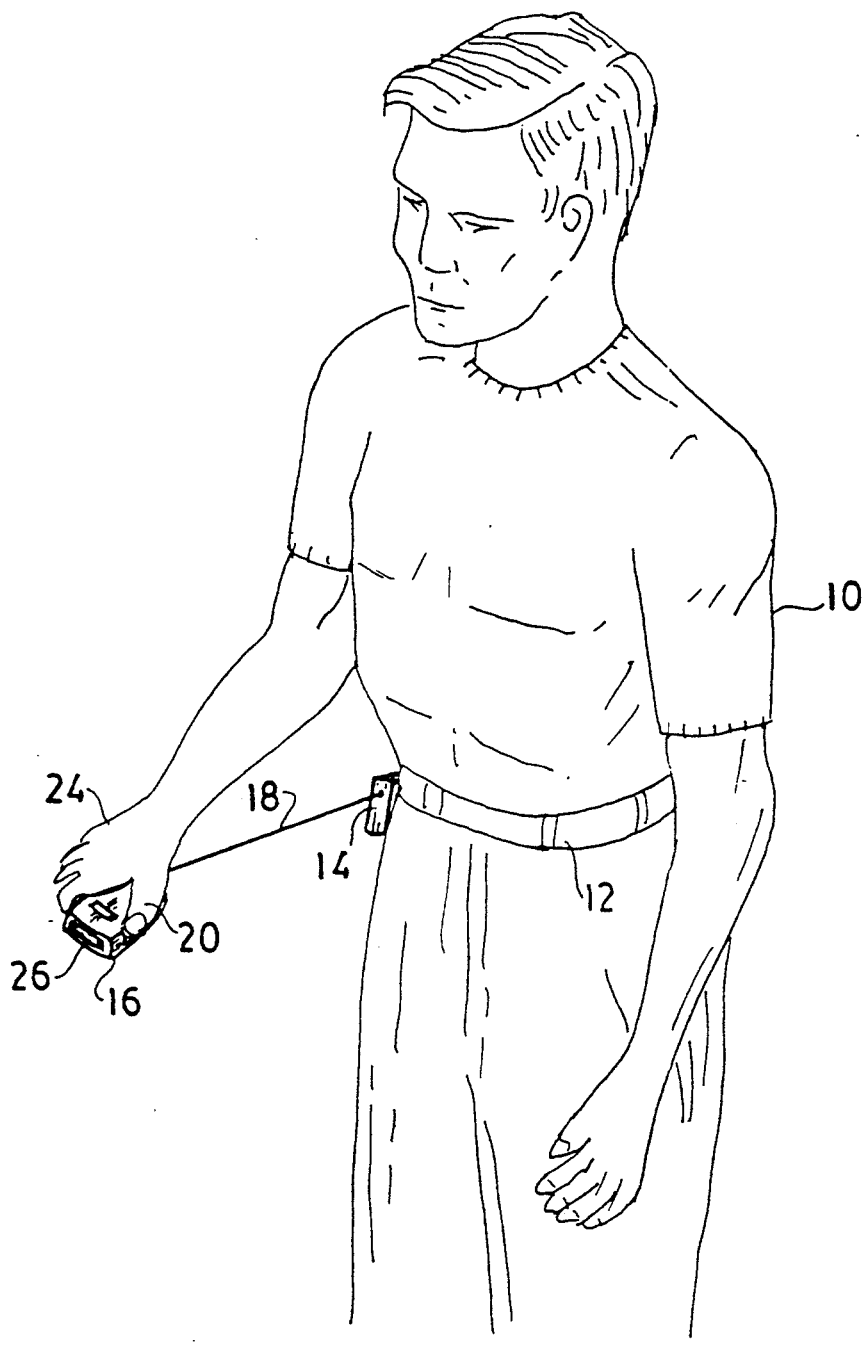
FIG. 1 is a perspective view of a handle-less bar code scanning system in operation.

Referring to FIG. 1 there is shown an operator 10 having a tool belt 12 on which a retraction mechanism 14, similar to mechanism used to retract measuring tapes, is attached. A handle-less scanner 16 is connected by way of a retractable cable 18 to the retractor 14. Alternatively, the retraction mechanism may be located entirely within the scanner 16. The unit 16 is of such a size as to be easily grasped in the hand of the operator. A trigger arm (blocked by the operators thumb 20 in the illustration) is depressed to operate the scanner when bar code reading operations are desired. The retraction mechanism may be strapped under the forearm.

Figure 2:
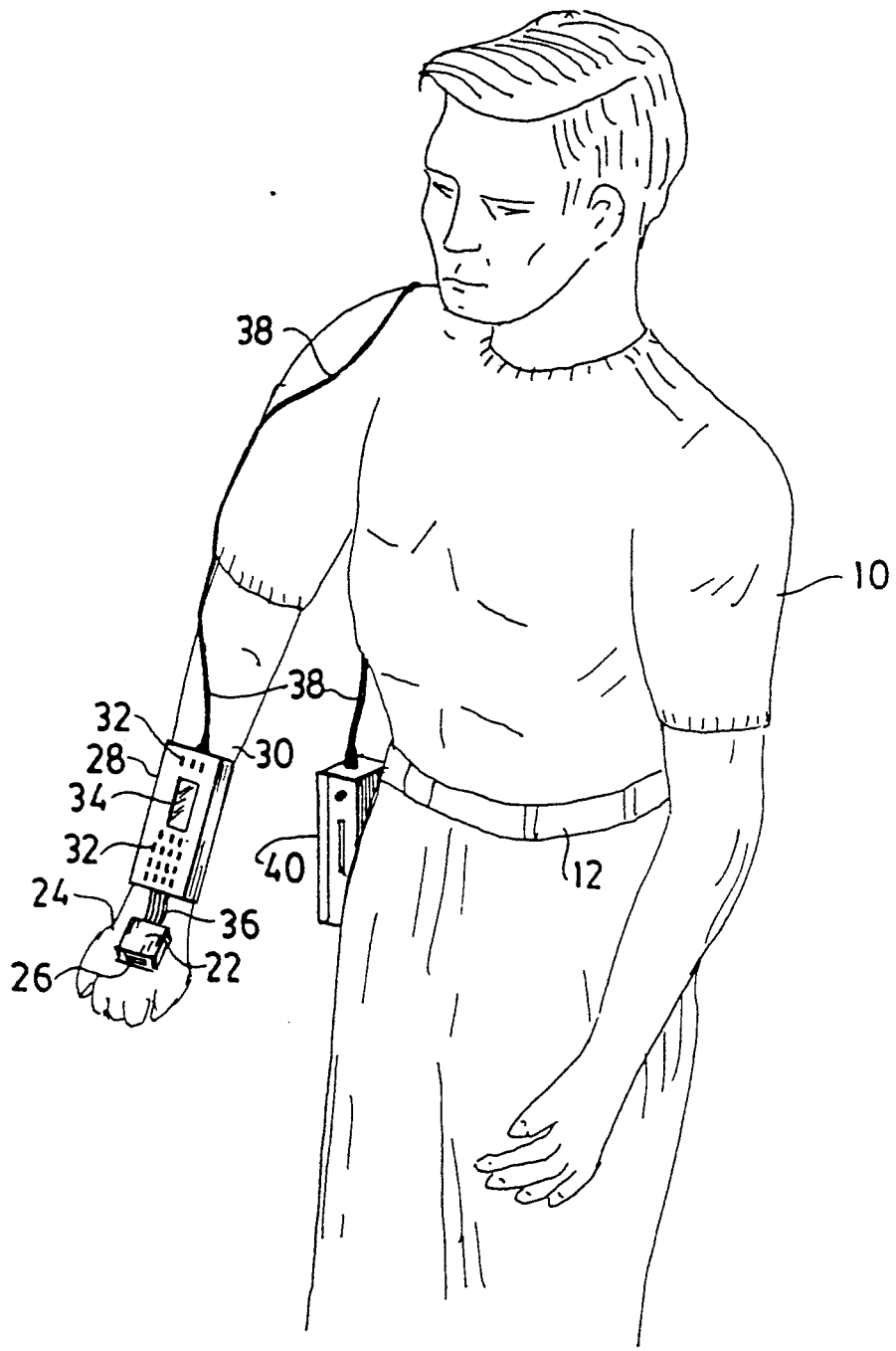
FIG. 2 is a view similar to FIG. 1 showing a handle-less scanning system having a hand mounted scanning unit, an arm unit and a terminal carried on the person of an operator.

FIG. 2 shows the operator 10 with a handle-less and hands free bar code scanning system provided in accordance with the invention. The system includes a scanner mounted by straps or a fingerless glove (not shown) on the back of the hand 24 of the operator between the fingers and the wrist. Both the scanner 16 (FIG. 1) and the scanner 22 have windows 26 in their forwardly facing side walls, which are presented to a bar code when scanning operations are initiated. The system of FIG. 2 includes an arm unit 28 which is held on the forearm 30 by straps (not shown). The bottom side of the arm unit 28 is generally cylindrical so as to fit around the arm and the top side has a keypad with keys 32 on opposite sides of a display panel 34. The arm unit is connected to the scanner by a cable, such as a flexible ribbon cable 36. Another cable 38 connects the arm unit to a belt mounted terminal 40. The terminal 40 complains the battery pack which provides electrical power which operates the scanner 22 and the arm unit 28. It also may have a radio or wire communications link to a central computer or dispatch station. The principal data collection memory is in the terminal 40. The arm unit 28 provides manual data entry and interactive message handling with the terminal 40. Additional keys may be mounted on the walls of the terminal 40 and an additional display may be carried either separately in the belt 14 or on the side wall or top of the terminal so as to be visible to the operator 10.

Figure 3:
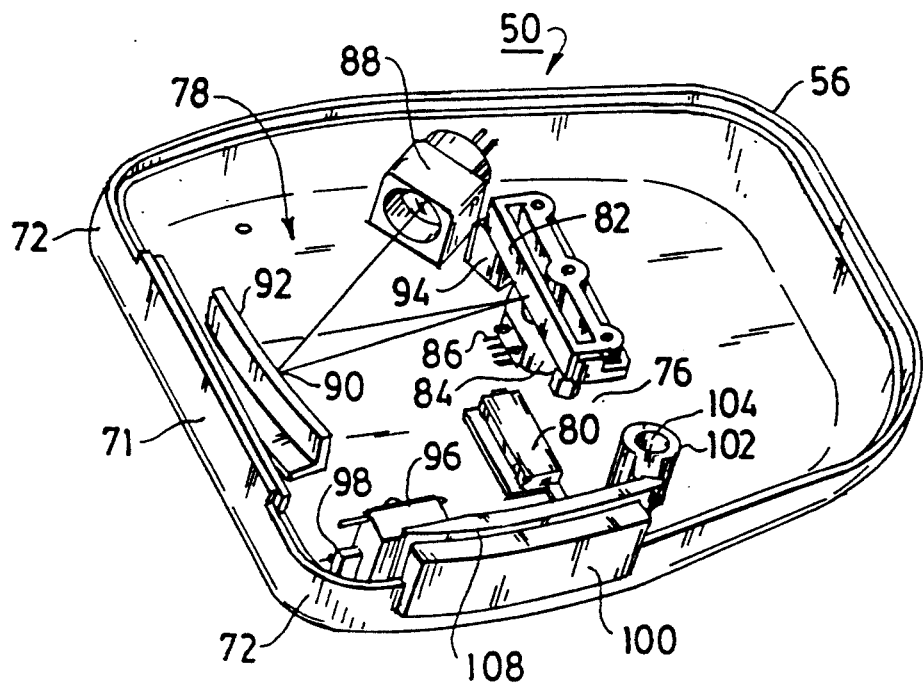
FIG. 3 is a perspective view of a handle-less scanner in accordance with the invention.
Figure 4:
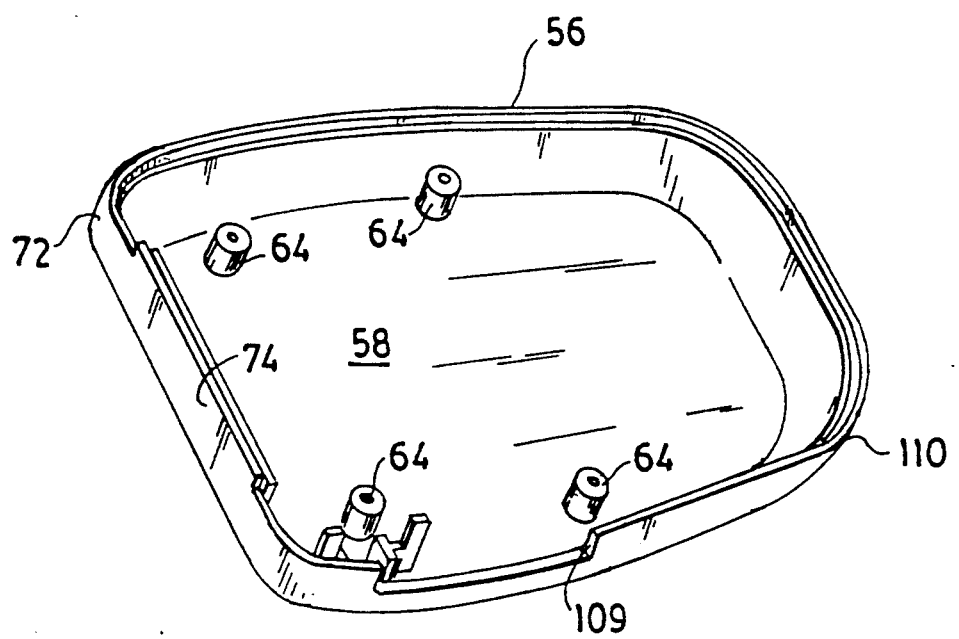
FIG. 4 is a perspective view of the lower case section of the scanner shown in FIG. 3.
Figure 5:
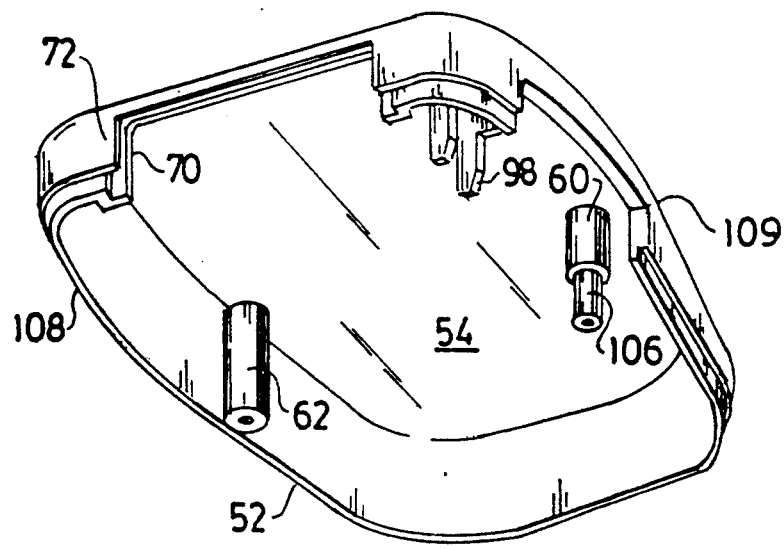
FIG. 5 is perspective view of the upper case section of the scanner shown in FIG. 3.

Referring to FIGS. 3 to 5 there is shown a bi-part lower case 50 having an upper case section 52 which defines the top wall 54 of the case and a bottom section 56 which defines the bottom wall 58 of the case. Posts 60 and 62 extend from the top wall 54. Other posts or stand-offs 64 extend upwardly from the bottom wall 58. A window opening 70 in the forwardly facing side wall 72 captures a transparent window 74.

Mounted on the bottom posts 64 is a printed circuit board 76 of a scan engine 78 of a design generally similar to the scan engine shown and described in U.S. patent applications Ser. Nos. 652158 filed Feb. 7, 1991, 710839 filed Jun. 5, 1991 and 786147 filed Oct. 31, 1991 and assigned to the same assignee as this application. Electrical and optical components are mounted on the board. They include a connector 80 to which the cable 18 or 36 is connected and is led out through a strain relief in the side wall of the casing (not shown). Other electrical components are mounted on the board as is printed wiring. A scanning mirror 82 is driven by a motor 84. Power from the motor arrives via a connector 86. Leads from the connector are attached to the printed wiring on the board 76. A laser diode assembly 88 projects a beam through a facet on a mirror 90 which reflects the beam to the scanning mirror 82. The scanning mirror projects the beam outwardly through the window 74. A photodetector assembly 94 is disposed between the motor 84 and the laser diode assembly 88 and receives light which passes through the window 74 from the bar code as it is being scanned by the beam. Scanning may be accomplished in the scan engine by other means than the illustrated electro-optic assembly for moving a laser beam across the bar code and collecting the light using the collection mirror 92 and scanning mirror 82 as shown in FIG. 3 and more fully described in the above referenced applications.

The handle-less scanner in FIGS. 3 to 5 utilizes a electrical switch unit 96 which is captured in bars 98 in the upper and lower case sections 52 and 56. This switch has a button which is spring biased outwardly against tile back side of an arm 100 having a offset foot 102 with a hole 104 providing a journal on a pin or shaft section 106 of the post 60. A shoulder 108 captures the arm 100 behind the side wall of the case section. The sections 52 and 56 have edges 108 and 110 which are rabbetted and overlap when they come together. Screws (not shown) through the board 76 and into the posts 64 hold down the printed circuit board 76. Screws (not shown) extending through the upper case section into the posts 60 and 62 enable the upper and lower sections 52 and 56 to be held together in assembled relationship, with the outer surface of the arm 100 projecting through the opening 109 in the side wall. The handle-less unit may readily be turned over for left handed operation. Alternatively the arm 100 may be mounted so that it projects to an opening in the top wall 54, if the application of pressure to the arm 100 from the top is found more desirable.

Figure 6:
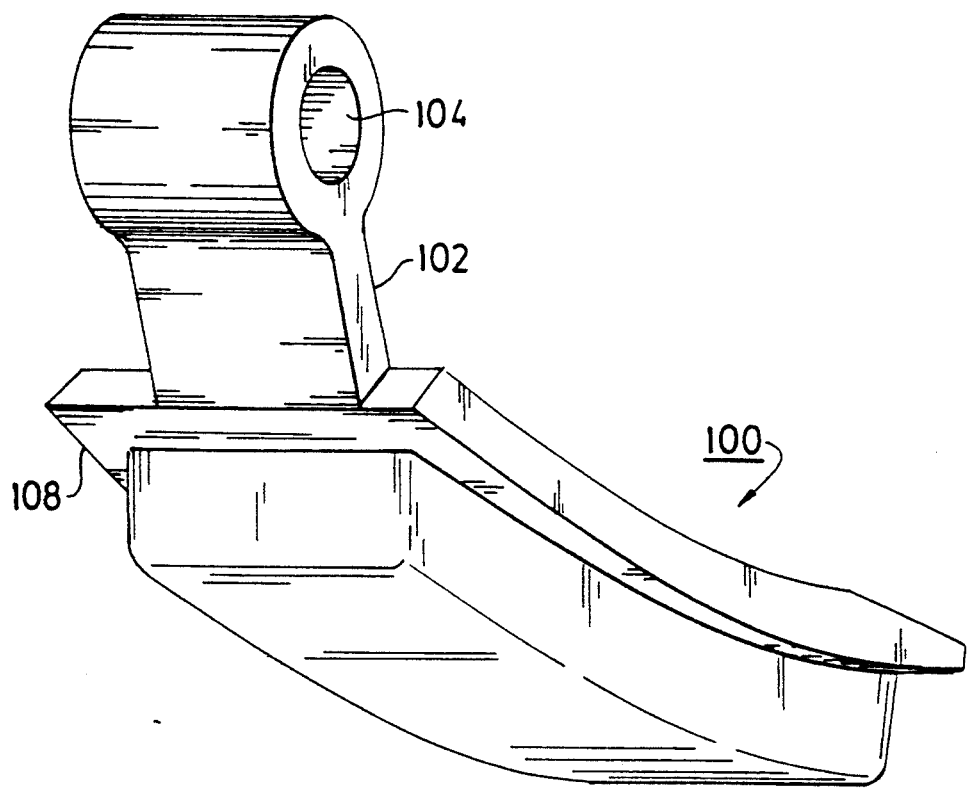
FIG. 6 is a perspective view of the trigger actuating arm of the scanning unit shown in FIG. 3.

The arm 100 is also shown in FIG. 6 turned 180° from the showing thereof in FIG. 3. The portion of the arm which projects through the opening 109 is curved with generally the same curvature as the side of the case 50 having the opening through which the arm 100 projects.

Figure 7:
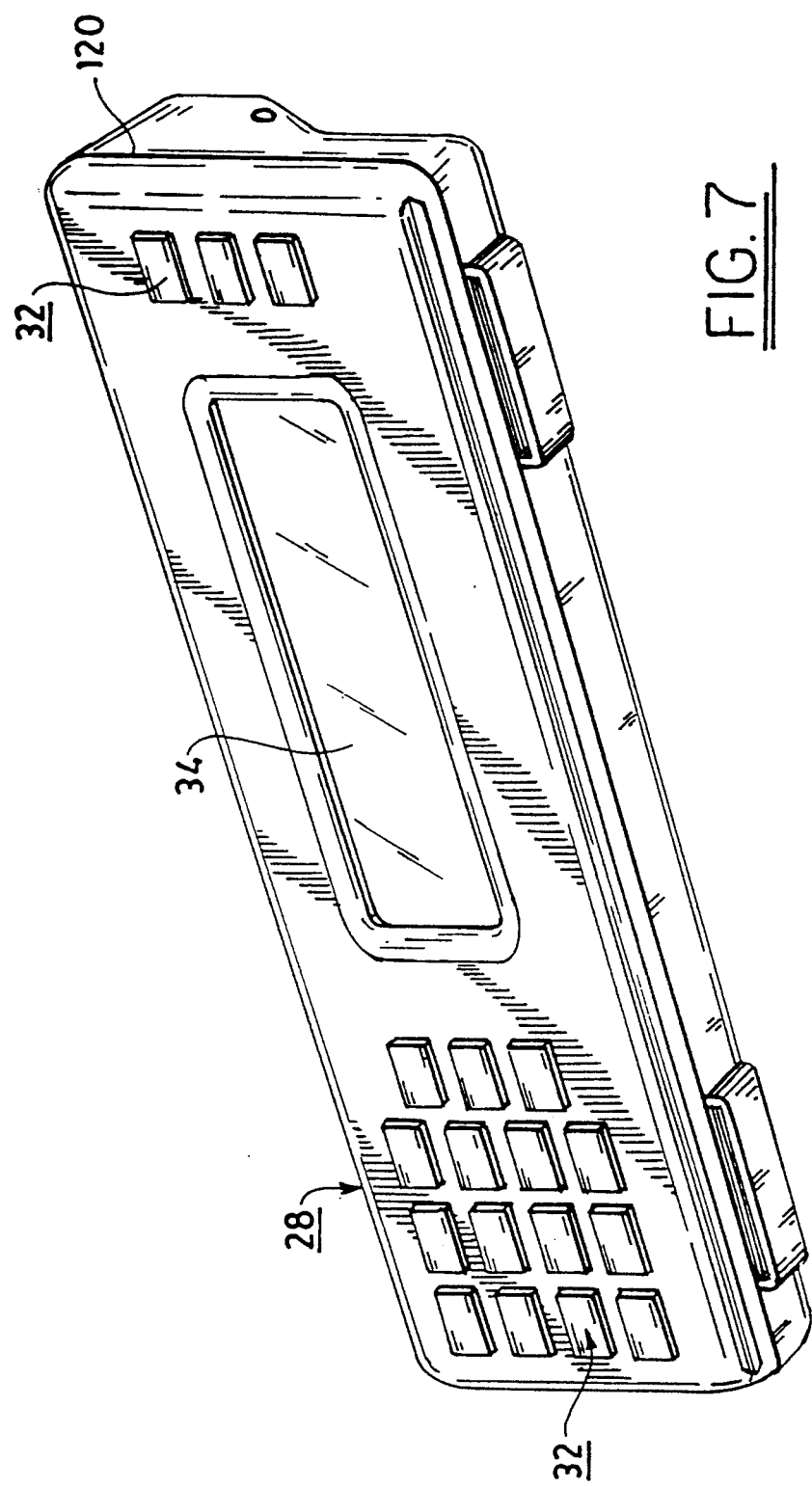
FIG. 7 is a top perspective view of the arm unit shown in FIG. 2.
Figure 8:
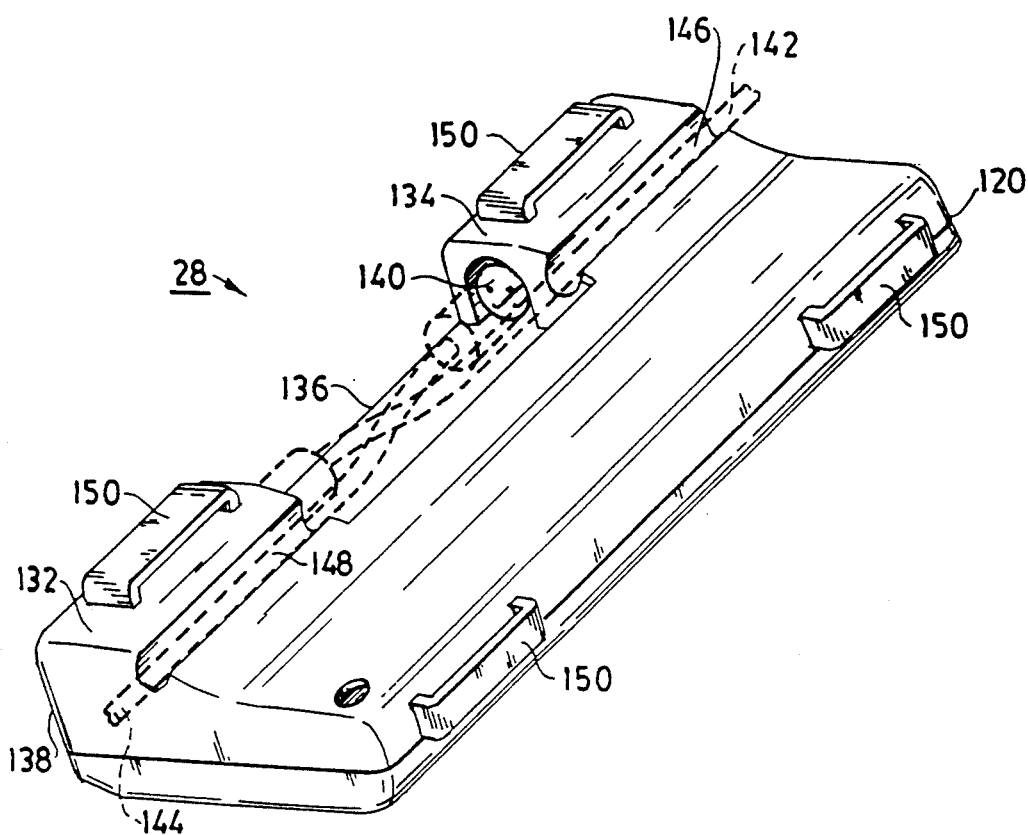
FIG. 8 is a bottom perspective view of the arm unit shown in FIG. 7 with cables in passageways with the cables crossing over to get into the passageways.
Figure 9:
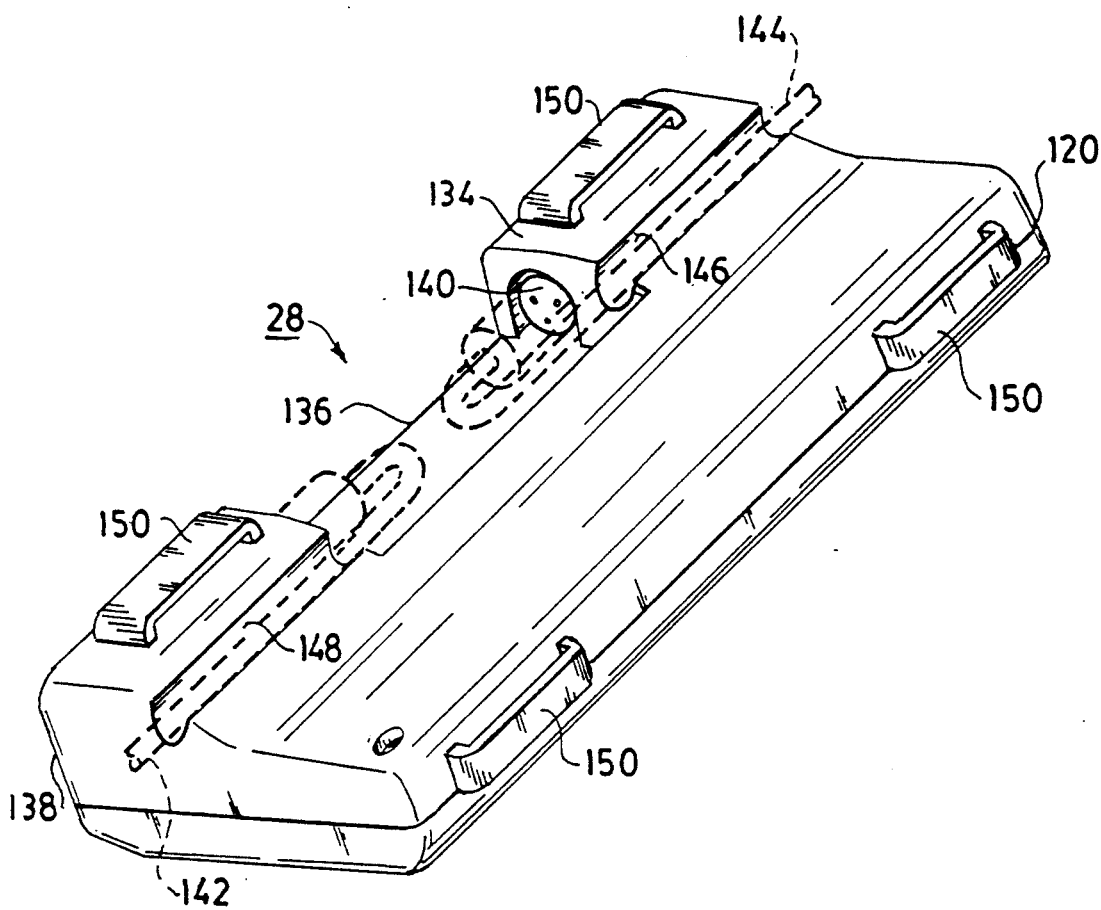
FIG. 9 is a view similar to FIG. 8 but with the cables shown bent back.
Figure 10:
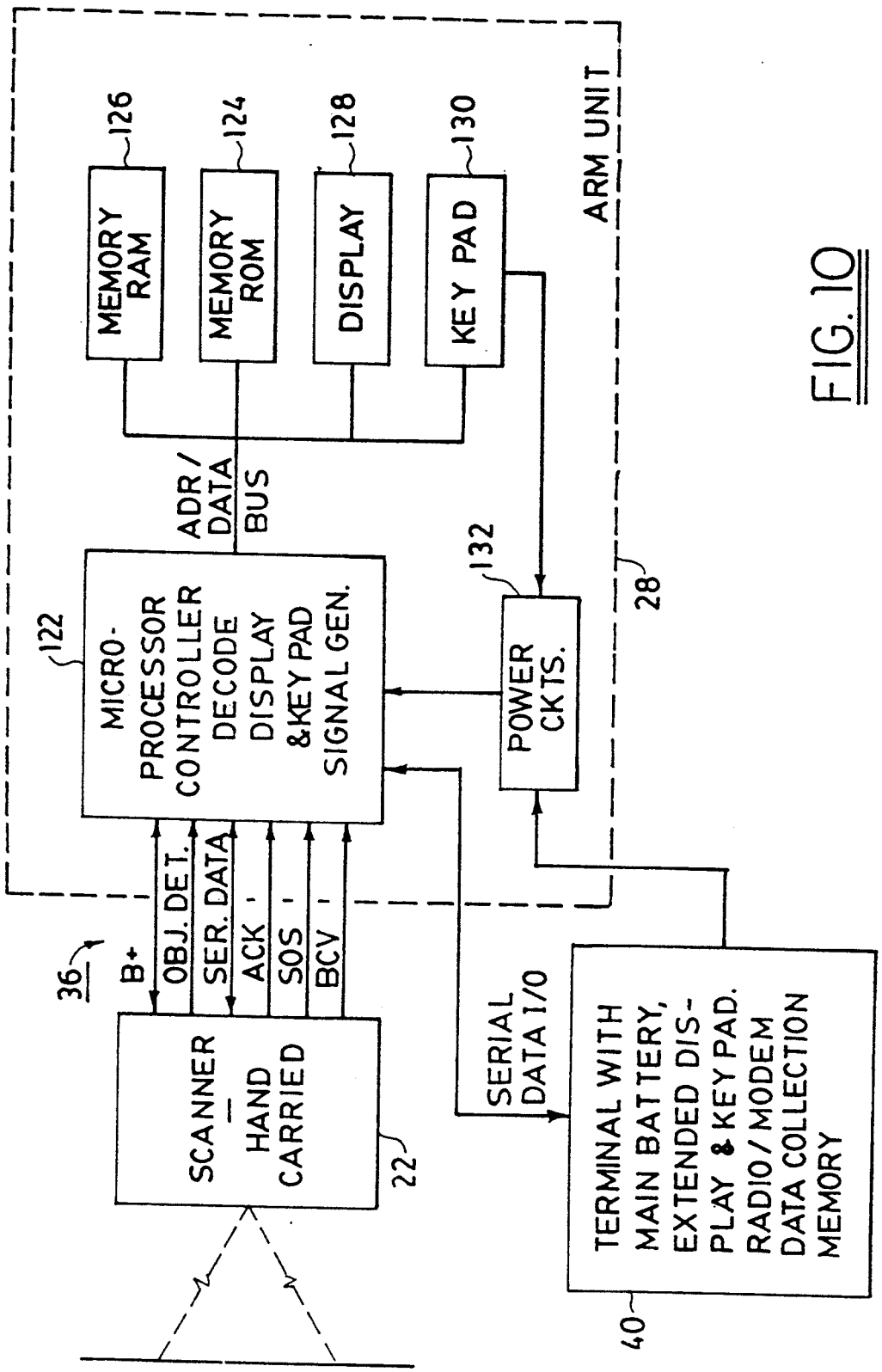
FIG. 10 is a block diagram of the scanner system shown in FIG. 2.

The arm unit 28 is shown from the top thereof FIG. 7 and from the bottom thereof in FIGS. 8 and 9. The arm unit is in a hi-part casing having upper and lower parts which are joined at edges along a parting plane 120. Inside the arm unit is the electronic system shown in the dash line block labeled "arm unit" in FIG. 10. The electronic circuits may be mounted on or connected to a printed circuit board. These circuits are a microprocessor controller 122 having associated read only memory 124 and random access memory 126. The read only memory (ROM) may be an EPROM chip. The random access memory may be a RAM chip. These memories are connected together with the display driver, the display circuit 128 and the keypad circuits 130 to the microprocessor 122 by way of a address/data bus.

The microprocessor 122 receives inputs from the scan engine of the scanner and also provides the operating power to the scanner along a operating power (B+) line. An object detection signal is connected to the microprocessor 122 by another line. Data to control the scanner and from the scanner is transferred over a serial data (SER. DATA) line. When a code is read, a signal is transmitted along an ACK or acknowledge line. The start of scans (SOS) is indicated by a signal along an SOS line and the signal representing the bar code (Bar Code Video-BCV) arrives at an input to the microprocessor along a separate BCV line. These lines may be separate leads on a flexible cable which is connected to the connector on the printed circuit board of the scan engine in the scanner 22.

The keypad controls power circuits 132. The regulator circuits and solid state switching circuits (transistor-preferably CMOS switches) connect d.c. power lines from the battery pack in the terminal 40 to the microprocessor to turn on the microprocessor when any key of the keypad is pressed. Battery power is therefore conserved until bar code reading or other data entry operations are desired. Communication with the terminal is by way of a serial data link (serial data I/O).

The terminal may have a radio link and a modem which communicates with a central computer or dispatch station. Data from the terminal then is communicated to the arm unit 28 and particularly to the microprocessor 122 thereof. The microprocessor then can transfer bar code information which is decoded into digital data to the terminal for storage therein in the data collection memory thereof. The data collection memory may be connected physically to the central computer or, upon command information in the data collection memory can be transferred to the central computer via the radio link and modem. Additional data entry operations may be provided by means of a keypad on the terminal. The terminal may also have an extended display for more messages than on the display 34 of the arm unit 28. [The top of the arm unit (see FIG. 7) has a 3 by 4 matrix of keys for numeric data 1 through 0 and * and # for "enter" or other commands. There are six other keys which are disposed adjacent to opposite ends of the display panel 34. Messages for interactive control of data collection operations are provided via the microprocessor 122 and the display driver 128 along opposite ends of the display to indicate different functions for these six keys. For example one of the keys may have a message appearing adjacent to it "items short?" at one time and another message "was bar code read?" at another time. The series of messages indicating different functions ascribed to these keys are flashed on the display to prompt the operator (a menu of messages) and the operator will operate the keys in accordance with these messages and the functions ascribed thereto. For example, a typical prompt message to enter the number of items in a bin may be displayed followed by a message adjacent to one of the keys at the ends of the display panel, to press that key after one or more of the keys in the 3×4 matrix has been depressed to transmit the number of items. Accordingly, various inventory management and stock control functions may be performed interactively and under program control with the programs contained in the terminal 40 or in a central computer.

The inside or bottom of the arm unit 28, as shown in FIGS. 8 and 9 is curved to have a generally cylindrical shape conforming with the shape of the forearm of the operator. There is a raised section with separate blocks 132 and 134 spaced by a notch 136 along a side edge 138 of the arm unit. Inside these blocks are connectors 140, only the one of which in the block 134 is shown in the drawings. The connectors 140 face each other and are adapted to receive mating connectors at the opposite ends of cables 142 and 144. Passageways (slots) 146 and 148 are provided along these blocks 132 and 134 and the cables are inserted and threaded through these passageways. The cables then do not interfere or project out so that they can be felt by the operator wearing the arm unit 23. The cables go either to the scanner 22 or the terminal 40. The cables can cross over as shown in FIG. 8 or be folded backwardly as shown in FIG. 9 depending upon how the arm unit is oriented which may be different for left handed and right handed operators. Loops 150 are integrally molded with the bottom section of the arm unit casing. These loops may receive bands or belts, preferably with velcro connectors which strap the arm unit around the forearm of the operator. In a presently preferred and herein illustrated embodiment, the arm unit weighs about seven ounces and the scanner weighs about two ounces, thereby militating against operator fatigue and enhancing operator productivity. The operator may be a smaller and weaker (non-muscular) person.

From the foregoing description it will be apparent that there has been provided improved bar code scanning systems and particularly handle-less scanning systems and scanning systems which provide hands free operation. Variations and modifications in the herein described systems within the scope of the invention will undoubtedly suggest themselves to those skilled in the art. Accordingly, the foregoing description should be taken as illustrative and not in a limiting sense.

What is claimed is:

1. A handle-less bar code scanning system which comprises a scanner unit having a case with side, top and bottom walls, said case having a window facing outwardly from one of said walls which is a side wall of said case, said side walls being spaced to define a region of width and length commensurate with an operator's hand on the surface thereof above the palm and between the wrist and fingers of said hand, so that said scanner unit can be located in said region, an arm unit having a case of length and width commensurate with the forearm of the operator, said arm unit having top and bottom walls, means for removably attaching said arm unit to said forearm with said bottom wall facing said forearm, said arm unit having cable passageways along said bottom wall, first and second connectors facing each other for receiving connectors on first and second cables, means on said arm unit for providing a manual data entry keypad having keys and also providing a display panel on said top wall of said arm unit, said keypad including keys adjacent to said display panel, a terminal unit adapted to be carried by the operator, and said first and second cables captured in said passageways and connecting said arm unit to said scanner and said terminal unit respectively, via said connectors.

2. The system according to claim 1 wherein said terminal carries batteries providing operating power for said terminal, said arm unit and said scanner, and means in said arm unit for enabling operating power to be applied to said arm unit and scanner upon actuation of a key on said keypad.

3. The system according to claim 1 wherein said arm unit has means for displaying different messages identifying different functions for the keys of said keypad adjacent to said display.

4. The system according to claim 1 wherein said arm unit weighs about seven ounces or less and said scanner weighs about two ounces or less.

5. The system according to claim 1 wherein said scanner has means for providing an output representing the presence of a bar code located before said window and signals representing said code, and said arm unit has means for decoding said bar code representing signals, means for operating said display, means for accepting signals corresponding to actuation of said keys and means for transferring signals corresponding to actuation of said keys and the decoded bar code representing signals to said terminal and for receiving data and commands from said terminal.

* * * * *